(12) United States Patent
Hockey

(10) Patent No.: US 7,801,960 B2
(45) Date of Patent: Sep. 21, 2010

(54) MONITORING ELECTRONIC MAIL MESSAGE DIGESTS

(75) Inventor: Alyn Hockey, Berkshire (GB)

(73) Assignee: ClearSwift Limited, Reading Berkshire (GB)

(*) Notice: Subject to any disclaimer, the term of this patent is extended or adjusted under 35 U.S.C. 154(b) by 1276 days.

(21) Appl. No.: 10/362,840

(22) PCT Filed: Aug. 29, 2001

(86) PCT No.: PCT/GB01/03852

§ 371 (c)(1),
(2), (4) Date: Oct. 17, 2003

(87) PCT Pub. No.: WO02/19069

PCT Pub. Date: Mar. 7, 2002

(65) Prior Publication Data

US 2004/0064515 A1 Apr. 1, 2004

(30) Foreign Application Priority Data

Aug. 31, 2000 (GB) .................................. 0021444.5

(51) Int. Cl.
*G06F 15/16* (2006.01)
(52) U.S. Cl. ........................ 709/206; 709/217; 709/218; 709/219; 709/227; 709/229; 707/999.001; 707/999.01; 707/999.107

(58) Field of Classification Search ......... 709/217–219, 709/227, 229, 206; 707/104.1, 10, 999.001, 707/999.01, 999.107
See application file for complete search history.

(56) References Cited

U.S. PATENT DOCUMENTS 5,812,668 A * 9/1998 Weber .......................... 705/79

(Continued)

FOREIGN PATENT DOCUMENTS

EP 0 720 333 A2 7/1996

(Continued)

OTHER PUBLICATIONS

U.K. Search Report.

(Continued)

*Primary Examiner*—John Follansbee
*Assistant Examiner*—Saket K Daftuar
(74) *Attorney, Agent, or Firm*—Paul, Hastings, Janofsky & Walker LLP

(57) ABSTRACT

A method for monitoring electronic mail messages, each mail message comprising header information and a main body, particularly for protection against virus attacks and unsolicited commercial email (UCE). The method comprises generating a summary digest of only the subject line and the message content of the main body, wherein the message content may comprise textual content and/or attached files. The generated summary digest is stored in a memory, and compared with existing summary digests stored in memory. If the number of matches exceeds a threshold value, an alert signal is raised and appropriate action initiated. A timestamp may be stored with each summary digest, together with sender/recipient details and the internet protocol (IP) address of origin, to aid detection of the originator of the message.

94 Claims, 3 Drawing Sheets

U.S. PATENT DOCUMENTS

| | | | | |
|---|---|---|---|---|
| 5,850,446 | A * | 12/1998 | Berger et al. | 705/79 |
| 5,889,863 | A * | 3/1999 | Weber | 705/76 |
| 5,931,917 | A * | 8/1999 | Nguyen et al. | 709/250 |
| 5,978,475 | A * | 11/1999 | Schneier et al. | 713/177 |
| 6,026,379 | A * | 2/2000 | Haller et al. | 705/34 |
| 6,052,709 | A * | 4/2000 | Paul | 709/202 |
| 6,072,870 | A * | 6/2000 | Nguyen et al. | 705/79 |
| 6,145,079 | A * | 11/2000 | Mitty et al. | 713/170 |
| 6,161,130 | A * | 12/2000 | Horvitz et al. | 709/206 |
| 6,161,181 | A * | 12/2000 | Haynes et al. | 713/170 |
| 6,199,052 | B1 * | 3/2001 | Mitty et al. | 705/75 |
| 6,304,915 | B1 * | 10/2001 | Nguyen et al. | 709/250 |
| 6,314,190 | B1 * | 11/2001 | Zimmermann | 380/282 |
| 6,314,421 | B1 * | 11/2001 | Sharnoff et al. | 707/5 |
| 6,321,267 | B1 * | 11/2001 | Donaldson | 709/229 |
| 6,324,525 | B1 * | 11/2001 | Kramer et al. | 705/40 |
| 6,330,590 | B1 * | 12/2001 | Cotten | 709/206 |
| 6,356,937 | B1 * | 3/2002 | Montville et al. | 709/206 |
| 6,363,363 | B1 * | 3/2002 | Haller et al. | 705/40 |
| 6,460,050 | B1 * | 10/2002 | Pace et al. | 707/104.1 |
| 6,557,036 | B1 * | 4/2003 | Kavacheri et al. | 709/224 |
| 6,630,944 | B1 * | 10/2003 | Kakuta et al. | 715/758 |
| 6,671,805 | B1 * | 12/2003 | Brown et al. | 713/176 |
| 6,728,378 | B2 * | 4/2004 | Garib | 380/259 |
| 6,754,661 | B1 * | 6/2004 | Hallin et al. | 707/100 |
| 6,816,884 | B1 * | 11/2004 | Summers | 709/206 |
| 6,895,507 | B1 * | 5/2005 | Teppler | 726/19 |
| 6,898,709 | B1 * | 5/2005 | Teppler | 713/178 |
| 6,959,288 | B1 * | 10/2005 | Medina et al. | 705/51 |
| 6,965,919 | B1 * | 11/2005 | Woods et al. | 709/206 |
| 7,130,885 | B2 * | 10/2006 | Chandra et al. | 709/206 |
| 7,149,778 | B1 * | 12/2006 | Patel et al. | 709/206 |
| 7,249,175 | B1 * | 7/2007 | Donaldson | 709/225 |
| 7,269,564 | B1 * | 9/2007 | Milsted et al. | 705/1 |
| 7,673,342 | B2 * | 3/2010 | Hursey et al. | 726/24 |
| 2002/0138582 | A1 * | 9/2002 | Chandra et al. | 709/206 |
| 2003/0135464 | A1 * | 7/2003 | Mourad et al. | 705/50 |
| 2004/0092310 | A1 * | 5/2004 | Brosnan et al. | 463/42 |
| 2008/0098125 | A1 * | 4/2008 | Wang Baldonado et al. | 709/231 |

FOREIGN PATENT DOCUMENTS

| | | |
|---|---|---|
| GB | 2 317 793 | 4/1998 |
| WO | WO 99/14909 | 3/1999 |
| WO | WO 99/32985 | 7/1999 |
| WO | WO 99/33188 | 7/1999 |
| WO | WO 99/67731 | 12/1999 |
| WO | WO 00/26795 | 5/2000 |
| WO | WO 00/49776 | 8/2000 |
| WO | WO 01/46872 A1 | 6/2001 |

OTHER PUBLICATIONS

Examination Report dated Sep. 19, 2003.
International Search Report Dated Jul. 12, 1999.
Internet Article by Paul Rubin re spam (hash codes) dated Feb. 20, 1995.
Article by Ragnar Lonn re: automated spam detection dated Feb. 16, 1999, pp. 1-2.
Internet Article "Re: Automated Spam Detection" by Kettlewell dated Feb. 16, 1999.
Article by Gartner Consulting dated Jun. 14, 1999 Entitled "ISPS and Spam: The Impact of Spam on Customer Retention and Acquisition" pp. 1-14.
Article Entitled Multipurpose Internet Mail Extensions Part I: Format of Internet Message Bodies, pp. 1-10 and pp. 3-6.

* cited by examiner

MONITORING ELECTRONIC MAIL MESSAGE DIGESTS

TECHNICAL FIELD OF THE INVENTION

This invention relates to networked computer systems security in general and protection against Denial of Service (DoS) attacks, virus attacks and unsolicited commercial email in particular. More specifically, this invention concerns an apparatus and method for managing electronic mail message processing.

BACKGROUND TO THE INVENTION

Recent years have witnessed a proliferation in the use of the Internet. Many stand-alone computers and local area networks connect to the Internet for exchanging various items of information and/or communicating with other networks.

Such systems are advantageous in that they can exchange a wide variety of different items of information at a low cost with servers and networks on the Internet and other networks.

However, the inherent accessibility of the Internet increases the vulnerability of a system to threats such as cracker attacks, Denial of Service (DoS) attacks, viruses and unsolicited commercial email (UCE). Around 5-10 new viruses are discovered each day on the popular Windows-based operating systems. Especially insidious are those that propagate through the Internet, for example by using mail messages as a transport mechanism, known as email worms. The concern for advanced security solutions for networked systems in particular is therefore substantial.

In contrast to traditional viruses which are designed to spread themselves on a single computer using the file handling capabilities of an operating system, a worm exploits a computer's networking capabilities as the transport mechanism to enable it to infect other machines. Email worms, for instance, may comprise a file attachment to a mail message, or comprise a script or code embedded into the text of a mail message. The worm may exploit scripting capabilities of internet mail client software to send malicious code to other users on a mailing list or newsgroup automatically, and thus appear as having originated from a legitimate sender.

In particular, an email worm may exploit a user's email address book to obtain targets to spread to. To the recipient, the worm would appear to have been sent by a familiar source, as their presence in the address book would imply that previous email dialogue had taken place. Therefore, a further email apparently from that source would not appear out of the ordinary. Such emails may comprise a suitably benign message as further means of deception to the recipients.

Especially threatening are email worms which require no action on the part of the recipient (such as opening a mail message) to install and activate the malicious code. For instance, some mail clients, such as Outlook Express (™) and Outlook (™) support a "preview" pane which typically scans all unread messages in a user's electronic mailbox. Such a "preview" is sufficient to install and activate such a worm if present amongst the unread messages.

Other types of worms are known. For instance, a worm could spread over a local area network (LAN), wide area network (WAN) or peer-to-peer network directly by determining the network addresses of other computers on the network and sending copies of its code to these addresses. Such files would appear to originate from a legitimate machine.

A further category of worm spreads using internet relay chat (IRC), a protocol allowing real time communications between Internet users and other features such as transfer of data and executable files over IRC channels. Popular IRC client software supports scripting features. For example, an IRC script could send a message or data file automatically to specified users when they connect to an IRC channel. Special scripting commands allow execution of DOS and Windows executable files allowing infected scripts to propagate and transfer worm code to other machines.

A growing concern amongst Internet users is that of unsolicited commercial email (UCE), commonly referred to as "spam". The ease and low cost of distributing email messages has made mass marketing via email an attractive advertising medium, particularly for bogus homeworking schemes, business and investment opportunities, lottery schemes, money-making clubs and chain letters. Bogus schemes are often characterised by exaggerated earnings claims, glowing testimonials, "no risk" guarantees and legal assurances. Such "spam" messages have led to added costs for both recipients and internet service providers (ISPs) in the form of additional bandwidth, disk space, server resources, and lost productivity. Furthermore, many users consider "spam" messages offensive and an invasion of privacy. The current growth rate of "spam" suggests that the problem may become unmanageable if it continues to grow at the current rate.

A known approach for addressing the problem of "spam" is to use a mail filtering system implemented at an Internet Service Provider (ISP) server, organisation's mail transfer agent (MTA) or user terminal. Such a filtering system sorts incoming email into categories, typically determined by the recipient. WO 99/32985 discloses a system and method of filtering junk emails comprising a first list of unapproved email addresses and character strings which a user wishes not to receive and a second list of approved email addresses and character strings which the user wishes to receive. The first list is periodically updated on the basis of further mail messages that the user rejects. However to remain effective, the filtering instructions must frequently be updated as new junk mail messages appear. Furthermore, it does not aid in tracking the originator of "spam" messages.

EP 0720333A discloses a technique for reducing the quantity of "spam" messages received by a user whereby a recipient specifier containing non-address information is added to an email message. The mail filter for a given recipient has access to information about that recipient and uses that information together with the non-address information in the email message to determine whether the message should be provided to the given recipient. If the non-address information and the information about the recipient indicate that the given recipient should not receive the message, the filter does not provide it. Such "non-address information", however, comprises two additional components, namely a recipient specifier and a referral list, which accompany the email message. These components must be adopted by all parties wishing to communicate with the specified user for the method to be effective. Furthermore, said information increases the size of the mail message and hence storage space and bandwidth requirements. In addition, this method is of limited use in detecting email worms as email worms are characterised by their traffic behaviour rather than by any particular sender.

In the method of WO 99/33188, a system is provided for controlling delivery of unsolicited electronic mail messages, whereby "spam" probe email addresses are created and planted at various sites on a communications network in order to ensure their inclusion on large-scale "spam" mailing lists. Upon receipt of incoming email addressed to the span probe addresses, the received email is analysed automatically to identify the source of the message, characteristic spam source data extracted from the message, and an alert signal generated containing the spam source data. A filtering system implemented at the servers receives the alert signal and updates filtering data using the spam source data retrieved from the alert signal, and controls delivery of subsequently received email messages received from the identified spam source.

One shortcoming of this method is that, whilst convenient for monitoring spam, it is of limited utility against a DoS attack, email worm or other traffic based mechanism, such as an incorrectly configured mail system that accidentally loops messages.

Accordingly, there is a need for a system that automatically and efficiently identifies unsolicited or threatening email messages and controls the delivery of these messages to users, for example by preventing delivery of these messages, or by identifying the messages as unsolicited by displaying the messages in a distinctive display mode.

STATEMENT OF THE INVENTION

It is an object of the present invention to provide a system and a computer-implemented method for automatically and efficiently identifying recurrent mail messages. Such a method is particularly advantageous for users of electronic mail, for example, in filtering email worms and unsolicited commercial email (UCE).

According to a first aspect of the present invention, there is provided a method for monitoring electronic mail messages, wherein each mail message may comprise:

(a) subject header information
(b) non-subject header information
(c) a main body, comprising message content;

the method comprising:
receiving an electronic mail message,
generating a characteristic numerical representation of at least a part of said message content, but not of said non-subject header information;
storing said generated characteristic numerical representation in a memory; and
comparing said characteristic numerical representation with each characteristic numerical representation stored in memory.

Such a method is advantageous as a large quantity of data may be rapidly and automatically searched for matches, whilst significantly reducing the amount of data to be stored. When implemented, for example, in a mail server or organisation's mail transfer agent (MTA), a considerable database can be assembled over a time period. This ensures that the searching is extensive and also enables monitoring of traffic activity.

Preferably, the step of generating comprises generating a characteristic numerical representation of at least a part of said message content and of said subject header information.

Preferably, the step of generating a characteristic numerical representation of at least a part of said message content comprises generating a characteristic numerical representation of at least textual content in said message content.

Preferably, the step of generating a characteristic numerical representation of at least a part of said message content comprises generating a characteristic numerical representation of at least attached files in said message content. Generating characteristic numerical representations of attached files assists in monitoring of email worms which rely on file attachments in order to propagate. In an embodiment, the step of generating may produce a characteristic numerical representation of said file attachments only. This enables the speed of the search to be increased, for example, when scanning for virus worms.

Preferably, a timestamp of said electronic mail message is stored. Such a timestamp may be provided from a defined public time service, such as a public time server on the Internet. Preferably, the internet protocol (IP) address of origin of said electronic mail message is further stored. These assist in detecting of the originator of said mail message.

Preferably, the header information is stored. Further preferably, said header information comprises message source and destination details. Comparison of these allows determination of whether the message is a simple resend, a bulk circulated email, or transmitted via multiple routes.

Preferably, said generated characteristic numerical representation is a message digest, for example generated using a message digest 5 (MD5) algorithm or a hash, for example generated using secure hash algorithm 1 (SHA-1). These algorithms produce a condensed, fixed size hash of 128 bits and 160 bits respectively, and are essentially unique, permitting a fast and straightforward comparison of the electronic mail messages to be made.

Preferably, said method further comprises, if said is characteristic numerical representation matches a characteristic numerical representation stored in memory, incrementing a count value associated with said characteristic numerical representation.

Further preferably, said method further comprises comparing said count value with a predetermined threshold. Still further preferably, said predetermined threshold is determined on the basis of said header information. This enables a different threshold to be set for characteristic numerical representations having the same sender and destination information, a same sender and a different destination, a different sender but a same destination, and different senders and destinations.

If said count value exceeds said predetermined threshold, an alert is preferably raised. Furthermore, said alert is preferably determined on the basis of said header information.

Preferably, said alert comprises flagging said message with a marker prefixed to the subject line of the message. In an embodiment, said marker may comprise the word "JUNK", "SUSPICIOUS" and may further be user configurable.

Preferably, said alert comprises delivering a fixed portion of said message only. For example, the first 512 and last 512 bytes of a message could be delivered to the recipient. Preferably, said alert comprises delivering an audit notification to the recipient. This would enable the recipient to confirm that the message is unsolicited whilst economising on bandwidth.

Preferably, said alert comprises deleting the message. Preferably, said alert comprises deleting a file attachment from the message. This facility is useful in instances where the message has already been sent to a same destination a number of times, where a message is suspected of being an email worm, or in guarding a destination or mail server thereof against cracker attack.

In a preferred embodiment, said method further comprises, allowing said message to be delivered if said characteristic numerical representation matches an approved characteristic numerical representation stored in memory. Such a "white list" of approved characteristic numerical re-presentations may include those of routine test messages, or other routinely sent "bulk" messages.

Preferably, said characteristic numerical representation is stored in cache memory. Further preferably, the maximum number of characteristic numerical representations stored in cache memory is configurable and said cache memory may preferably be periodically copied to a storage means. The use of cache memory to store recent characteristic numerical representations allows the database of characteristic numerical representations to be searched more quickly.

In accordance with a second aspect of the present invention, there is provided a software product for use in a server or organisation's mail transfer agent (MTA), for monitoring electronic mail messages, wherein each mail message may comprise:
 (a) subject header information
 (b) non-subject header information
 (c) a main body, comprising message content;
the software containing code for:
 receiving an electronic mail message,
 generating a characteristic numerical representation of at least a part of said message content, but not of said non-subject header information;
 storing said generated characteristic numerical representation in a memory; and
 comparing said characteristic numerical representation with each characteristic numerical representation stored in memory.

In accordance with a third aspect of the present invention, there is provided a software product for use in a client's mail user agent (UA) for monitoring electronic mail messages, wherein each mail message may comprise:
 (a) subject header information
 (b) non-subject header information
 (c) a main body, comprising message content;
the software product containing code for:
 receiving an electronic mail message,
 generating a characteristic numerical representation of at least a part of said message content, but not of said non-subject header information;
 storing said generated characteristic numerical representation in a memory; and
 comparing said characteristic numerical representation with each characteristic numerical representation stored in memory.

In accordance with a fourth aspect of the present invention, there is provided a computer system for monitoring electronic mail messages, wherein each mail message may comprise:
 (a) subject header information
 (b) non-subject header information
 (c) a main body, comprising message content;
the system comprising:
 means for receiving an electronic mail message,
 a processor for generating a characteristic numerical representation of at least a part of said message content, but not of said non-subject header information;
 a memory for storing said generated characteristic numerical representation; and
 means for comparing said characteristic numerical representation with each characteristic numerical representation stored in memory.

BRIEF DESCRIPTION OF THE DRAWINGS

For a better understanding of the present invention, and to show more clearly how it may be carried into effect, reference will now be made, by way of example, to the accompanying drawings, in which:—

DETAILED DESCRIPTION OF THE PREFERRED EMBODIMENTS OF THE INVENTION

Figure 1:
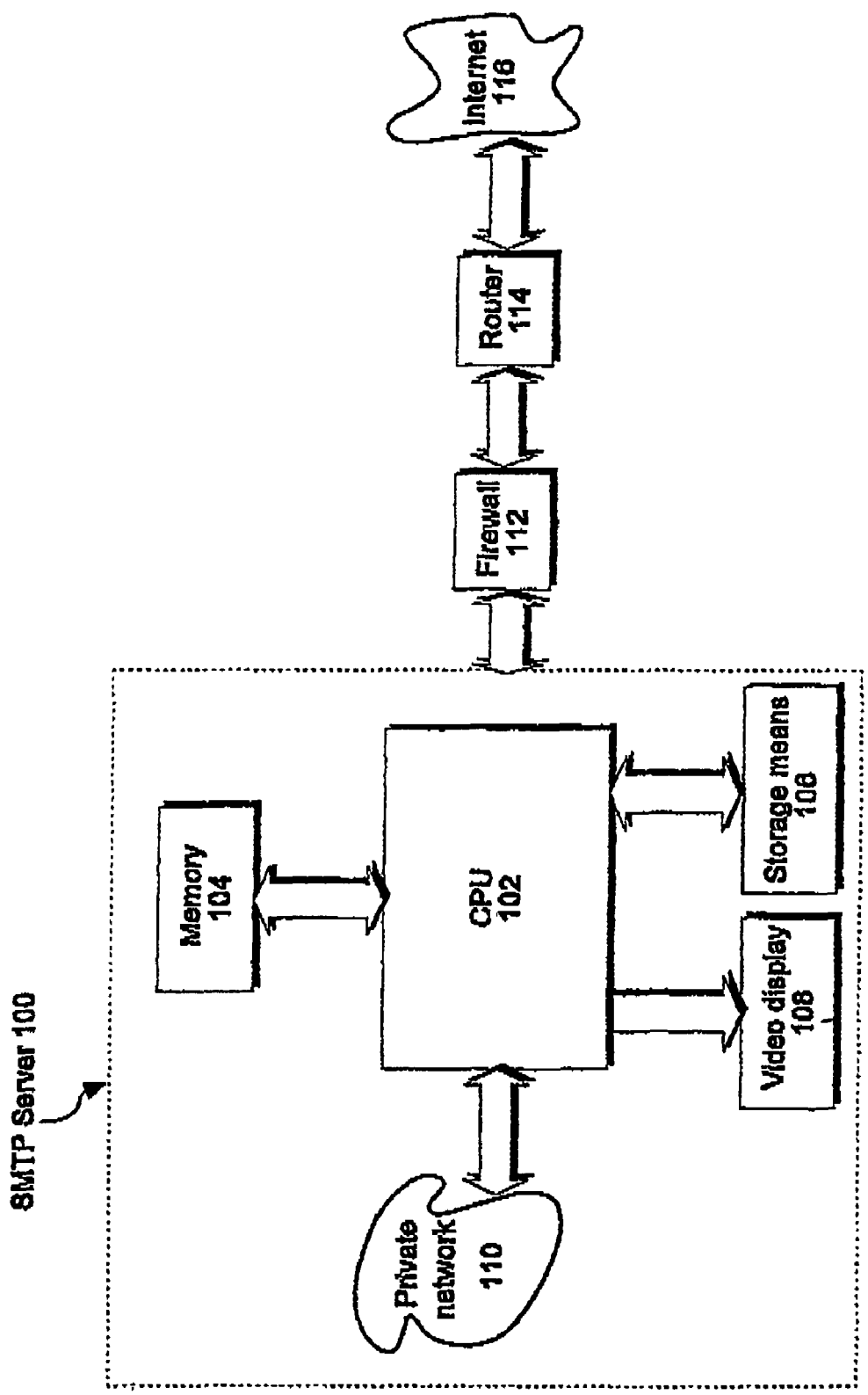
FIG. 1 is a block diagram of part of a computer network operating in accordance with the invention.

FIG. 1 of the accompanying drawings illustrates functional blocks of a server 100, such as a simple mail transfer protocol (SMTP) server, operable in accordance with the present invention. Server 100 comprises a central processing unit (CPU) 102 in communication with a memory 104. The CPU 102 can store and retrieve data to and from a storage means 106, and outputs display information to a video display 108.

Server 100 may be connected to and communicate with a private network 110 such as a local area network (LAN). In addition, server 100 may be able to send and receive files to and from a public network 116 such as the Internet, using an ISDN, serial, Ethernet or other connection, preferably via a firewall 112 and router 114. Internet 116 comprises a vast number of computers and computer networks that are connected through communications links.

Alternatively, local area network 110 may itself be connected through a server to another network (not shown) such as the Internet.

Server 100 may further comprise input peripherals such as a terminal having a mouse and/or keyboard (not shown) and output peripherals such as a printer or sound generation hardware, as customary in the art. Server 100 runs operating system and networking software which may be stored on disc or provided in read-only memory (ROM). Data may be transferred to server 100 via a removable storage means (not shown) or through either of networks 110, 112.

One format of data that may be transferred between servers is electronic mail (email) messages, typically using the Simple Mail Transfer Protocol (SMTP). A server adapted for this purpose may also be known as a Message Transport System (MTS). A variety of mail server software implementing the SMTP and other protocols is available for popular hardware and operating systems.

Mail reader software, also known as Mail User Agents (MUA), allows end users, such as customers which connect to their ISP using a dial-up modem connection, to access and read their email, typically using the Post Office Protocol (POP3) or Internet Message Access Protocol (IMAP). In addition, messages may be sent, typically using the SMTP protocol.

Figure 2:
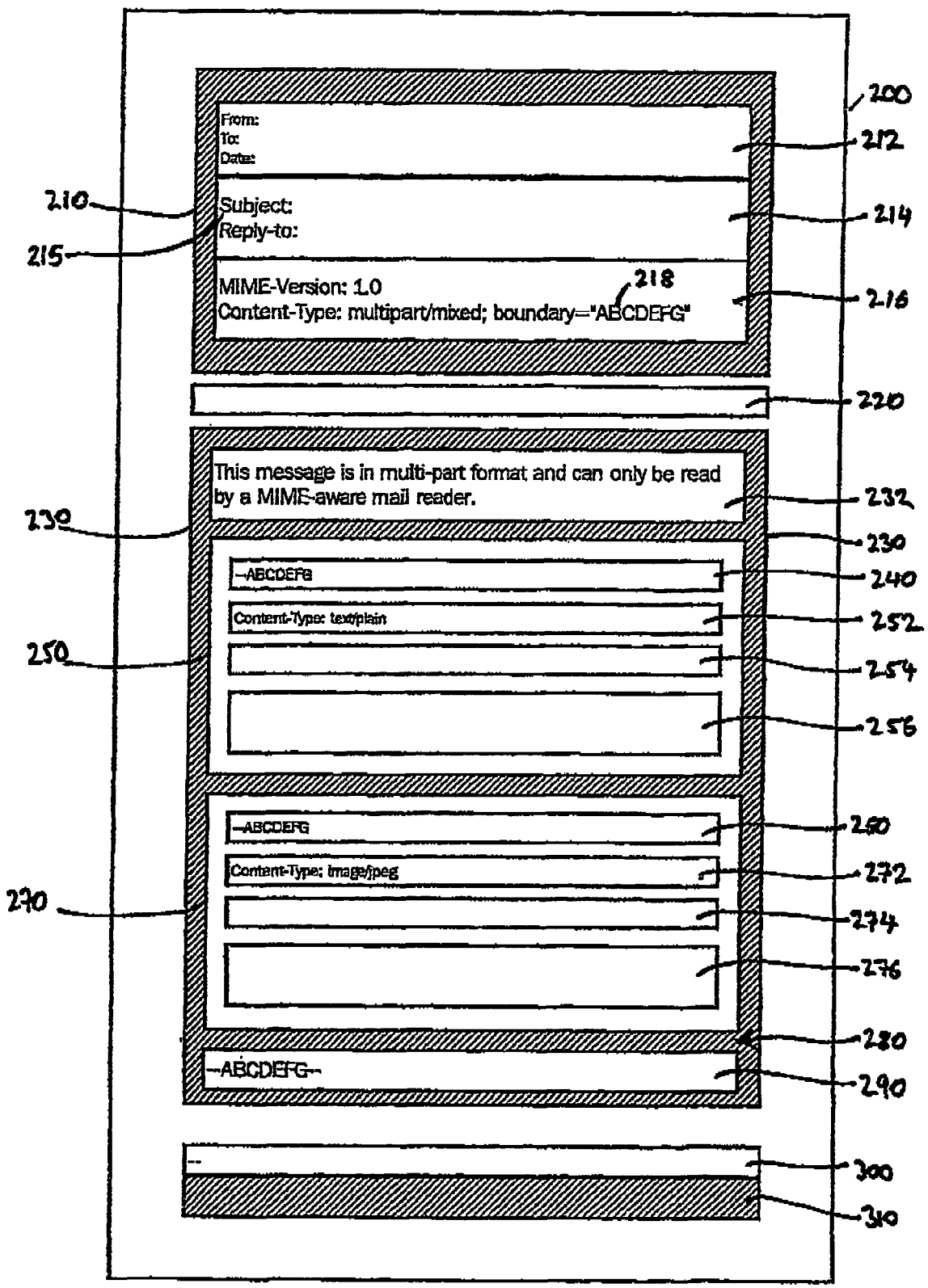
FIG. 2 is a multi-part email message illustrating message body structure.

The accepted standard format for messages carried by the Internet mail system is defined by Request for Comments (RFC) 822 (published on the Internet). As shown in FIG. 2, email message 200 comprises header information 210, including subject header information 215, typically input by the sender of the message, and non-subject header information, including the identity of the sender and the intended recipient(s), and the date. The header information is followed by the body 230 of the message, conventionally separated from the header by a blank line 220.

The order of header information 210 is not important in most cases, and many headers 214 are optional, but the mandatory headers 212 that must be present are Date:, From: and one of To:, Cc: or BCC:. The keyword may be in any mixture of capitals and small letters, so CC: is the same as Cc:. The subject header 215 although optional, is generally used.

The main body 230 of the message may comprise plain American Standard Code for Information Interchange (ASCII) text, or may assume a multi-part format allowing textual and non-textual message bodies to be represented and exchanged without loss of information. For instance, the Multipurpose Internet Mail Extensions (MIME) standard was created to address limitations concerning the structure and content of an email. Such a multi-part format, defined by RFC2045 and RFC2046 (published on the Internet), also permits representation of body text in character sets other than ASCII through content encodings, as well as representation of non-textual material such as images and audio fragments.

Finally, the message body may be appended by an optional "signature", comprising a signature separator 300 followed by signature text 310. Conventionally, the signature separator 300 comprises two hyphens followed by a space but often may comprise a series of hyphens, asterisks or other characters. The signature text 310 typically includes a user's name, organisation, and contact details.

The structure of a multi-part message will now be described in detail. As FIG. 2 shows, further fields 216 relating to multi-part information are added to the header 210. Multi-part headers 216 identify the message 200 as being in multi-part format, and are used by mail reader software to interpret the message 200 correctly. The fields 216 comprise distinctive boundary separator text 218 which is used to separate different parts of the message body 230 pertaining, for example, to textual content, enriched textual content such as HyperText Markup Language (HTML), and attached files. As an example, assuming a file attachment is present, field 216 may read:

Content-Type: multipart/mixed;
boundary="ABCDEFG"

where "ABCDEFG" is the distinctive separator text 218.

Alternatively, the header may read

Content-Type; multipart/alternative;
boundary="ABCDEFG"

the use of the word "alternative" indicating by convention that the same content is repeated in different parts of the message but enhanced in some of the repetitions (e.g. message text in both plain and HTML versions).

The different parts of the message body 230 are separated by boundary separators 240, 260 comprising two hyphens followed by the boundary separator text 218. Although body 230 is shown as consisting of two parts 250 and 270, email message 200 may comprise more or fewer parts.

Any preamble text 232 positioned above the first boundary separator 240 will typically be ignored by a mail reader that understands multi-part format messages but will be displayed by a mail reader which does not support the multi-part format. That is to say, preamble text 232 is not considered part of the message content. Conventionally, such preamble text 232 may therefore be used to alert the recipient to the fact that the mail reader being used is not compliant with the format of the message, as shown.

The structure of the body parts 250, 270 will now be described, again with reference to FIG. 2. First body part 250 encloses header fields 252 and a body 256 which is separated from header 252 by a blank line 254. Header fields 252 conventionally define the type of data contained in body 256 and may specify any encoding necessary for the purposes of transfer of information contained in the body 256 through the mail system, so that the receiving program can reverse the process. A file conveyed within a message part body 256 in this way is known as an "attachment" to the message. Alternatively, header fields 252 may be empty, in which instance the body is conventionally interpreted as comprising US-ASCII text.

The structure of second body part 270, and any further body parts, is analogous to body part 220, and the reference numerals indicate like parts. Further body parts may then follow as generally indicated by 280.

To indicate the end of the multi-part body 230, the body 230 is terminated by an end of body separator text 290. End of body separator text 290 comprises two hyphens followed by the distinctive boundary separator text 218, followed by a further two hyphens.

Figure 3:
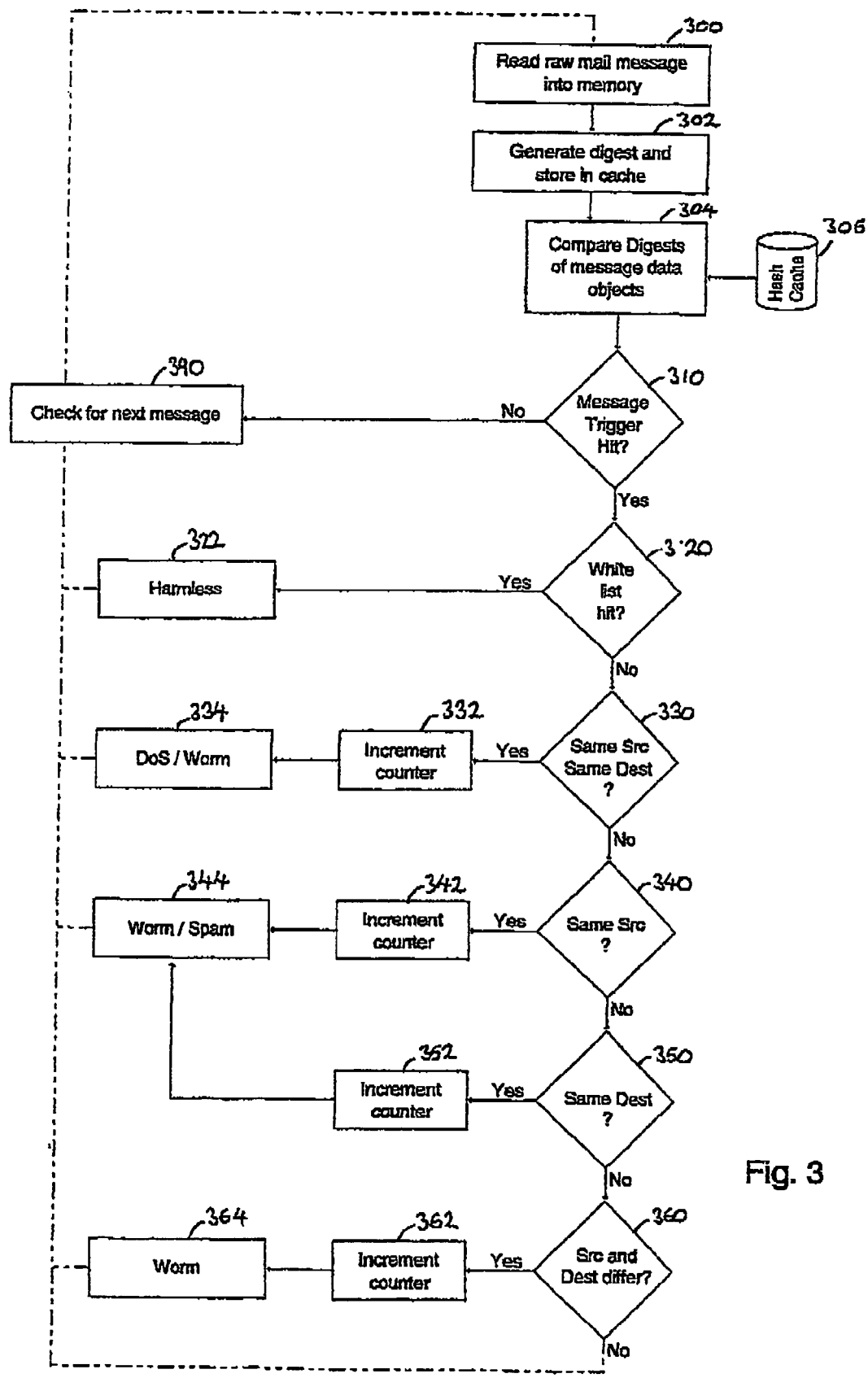
FIG. 3 is a flowchart illustrating operation of a software product in accordance with the invention.

Reference will now be made to FIG. 3, which describes the operation of an embodiment of the software in accordance with the invention. Preferably, the software is loaded permanently on a mail server, and remains in a quiescent state until an email message arrives at the server, typically from another server via SMTP. In step 300, the software intercepts an incoming mail message and reads it into memory. The software then determines whether the message is in multi-part format, and, if so, whether there are any file attachments to the message. Typically, this is done by examining the header for the following fields as part of step 300

MIME-Version and Content-Type: multipart/xxx where xxx may indicate a number of alternatives as customary in the art, such as "mixed", "alternative" and "parallel".

To determine whether the parts correspond to attached files, the body of the message may be scanned for the header field:

Content-Type: xxx xxx will typically read "Text/plain", "Text/html" or similar, for a message without any non-textual file attachments. If file attachments are present, xxx may read "image/jpeg", "audio/basic" or a number of other possibilities corresponding to a variety of file formats as customary in the art. The header would typically read "Content-Type: multipart/mixed" accordingly.

A characteristic numerical representation is generated for the combined subject line 215 and message content, in step 302. In the multi-part example given, the message content is obtained by taking the body 256 of the first part (text) 250 and the body 276 of the second part (image) 270, that is to say, any multi-part boundary information and any header information of each part is not considered to be part of the message content. Alternatively, if the message were not in the multi-part MIME format, the message content would be considered to be the entire body 230 of the message 200.

Such a characteristic numerical representation, or "hash" as known to one of skill of the art, is a message digest algorithm which takes a message of arbitrary length and produces a numerical representation comprising a number of bits sufficiently small to form a condensed digest of the original message and allow fast and straight-forward searching, but sufficiently large to be essentially unique.

Example algorithms include Message Digest 5 (MD5), developed by Rivest in 1991 and documented in Internet RFC1321 (published on the Internet) which takes a message of arbitrary length and produces a 128-bit message digest. An alternative is the Secure Hash Algorithm 1 (SHA-1) developed by National Institute of Science and Technology (NIST) which produces a 160-bit message digest. In both these cases, the messages are padded so they are a multiple of 512 bits long and processed in blocks if necessary.

Although in this example, a single digest has been generated for a multi-part message, in an alternative, variations such as generating a first digest, for the subject only, a second digest for the message content or separate digests for each body part may be performed. A user, such as a System Administrator, may define which elements would be used in generating the digests.

However, since a characteristic of virus worms is that they may cause the same message to be sent from different sources to different users in the network, it is preferable not to use the non-subject header information in generating the digest, if such a virus is to be detected.

The generated digest (or digests) is stored in a memory, together with the internet protocol (IP) address of where the message came from, sender information and destination details, and a timestamp to serve as a record of when the message was received. For instance, the time from a defined public time service, such as a public time server on the internet, may be used. Other information from the header may be stored such as the Message-ID field. Again, these options may be configured by a System Administrator.

To determine whether the textual content of the message or the attached files match those from previous messages received by the mail server 100, the digest is compared with existing digests stored in memory in step 304 and any matches noted in step 310. To this end, the use of message digest algorithms is advantageous in that they greatly reduce the amount of data to be stored and hence enable fast searching, whilst remaining essentially unique and thus ensuring the probability of conflict with a different mail message is extremely low. These considerations are important given that a typical user may be sent between 20-40 emails on average over a single 24 hour period.

For the method to be most effective, ideally the digest should be compared with those of mail messages sent over approximately the previous seven days, as typical spam messages will recur within a short period. Taking an organisation with 8000 users as an example, in which approximately one quarter of the emails sent share common content and hence produce a same digest, the total minimum number of digests to be stored at any one time is therefore in the order of 7 days×30 emails/day×8000 users×0.75=1,260,000. To accelerate the process, these most recent digests, in this case, those of mail messages sent over the last seven days, are stored in a cache memory 306 which could be flushed to disk periodically.

If the digest does not match an existing digest stored in cache memory 306, a check is performed in step 390 to determine whether there are further messages waiting to be processed by the mail server, and if so, the process will loop back to step 300 and read the next message in to memory. If no more messages are waiting, the process returns to a quiescent state in which it may perform background tasks such as transferring older hashes out of cache memory and onto disk whilst waiting for further messages to arrive.

Alternatively, if the digest matches an existing digest stored in memory, the following operations are performed;

Initially, the digest is compared in step 320 against a "white list" of approved digests believed to be harmless. These typically include test messages sent routinely, particularly by new users, to determine whether a mail system is functioning correctly. It the message is found to match such a digest, as indicated by 322, the message is allowed to proceed and the process will loop back to step 300 accordingly.

Alternatively, if the digest matched is not an "approved" digest, the sender/destination information (as indicated by the From:, To:, Cc: and Bcc: headers) and/or other header information stored with those hashes are compared. Firstly, in step 330, a check is performed to see if the digests share a common source and destination, and if so, a count value for this instance is incremented in step 332. One or more of a variety of actions may be performed, depending on the sender/recipient information and on how large a count value has accrued for the hash in question.

The most basic action possible is to allow the message to continue. This is appropriate, if the tally lies below a small threshold value (e.g. 5), as the sender and recipient details are the same. Such an instance could correspond to a simple resend.

However, if the threshold is exceeded, but still lies below a second value (e.g. 20), the message could be flagged as unsolicited, e.g. by displaying the message with a "Suspicious" or "Junk" prefix in the subject line on the video display 110, and transmitting only the header information, to save the recipient from downloading the message. Again, the thresholds and attributes used for distinguishing a flagged message may be user-configurable.

Finally, if this second threshold is exceeded, it is likely that the message could be a mailbomb or a form of cracker attack, such as the Denial of Service (DoS). In this case, the message could be deleted at the server.

A second possibility is that the digests may share a common source but have different destination information as indicated by 330. Again, a counter is incremented in step 342. Different thresholds and actions would correspondingly apply in this instance. As a variety of recipients are involved, the lowest threshold in this case may be set at a considerably higher value, such as 100, as a user may legitimately send a same message to a variety of recipients, such as a business newsletter, party invitation or information concerning a change of address. However, it is more conventional for a user to do this by specifying multiple destinations in the header information rather than to send separate messages each containing the same information.

If this threshold is exceeded, the message could be a Spam message or an email worm, as indicated by 344. As well as flagging a message as suspicious, a condensed form of the message could be safely delivered to the recipient (comprising the first and last 512 bytes of the message by way of example), together with an audit notification to inform the recipient that the message is suspected to be unsolicited. This action could inhibit harmful behaviour of the worm whilst enabling the user to verify whether the message is unsolicited and to request the entire message, if necessary.

In yet a further possibility, a message could share a common recipient as indicated by 350. Again, a counter for this instance is incremented in step 352. Such a situation could also correspond to both spam or worm activity.

In still yet a further alternative, a message may share a variety of senders and recipients. The threshold for taking the action of deleting the message may be set very low (e.g. 40). Such a message is likely to be an email worm, especially when the subject line is found to match in most cases and the majority of timestamps are found to lie within a very short period, such as seven days or less. A scoring system may be used to lower the threshold required if the file attachments, if any, are found to correspond, or the subject line is found to match.

It will be understood that this aspect of the process is subject to variations as customary in the art. For example, other options include changing the message attributes so that it may not be delivered or opened other than by a system administrator, and/or may place the file in a "quarantine zone"; an area of filespace with restricted access for review by a system administrator. Such quarantine zones are largely conventional in the art, e.g. used by junk and spam mail filtering programs to filter mail which is thought to be unsolicited. Typically, these options and thresholds would remain configurable by a system administrator.

A further application of the present invention is in tracking the originator of a spam message or worm. A system operator could perform a search of all messages that matched the "hash" value, to determine who sent the first message and where it originated. For instance, the internet protocol (IP) address stored with each Message could be used to provide this information. Depending on the number of "fields" stored with the digest, more detailed information could be obtained. Appropriate action could then be taken to identify the perpetrator.

Such a method is more effective than simply scanning the header fields in a single spam message, as these can be substituted by fraudulent header fields, often by experienced perpetrators of spat messages. A typical example is the substitution of the "received;" header.

There is thus described a method, software product and a computer system which provide for detecting email worms and spam messages.

Although the software is primarily intended for use in a mail server of an Internet Service Provider (ISP), or in an organisation's mail transfer agent (MTA), the software could also be used at the client end, or mail user agent (MUA). Such software would function on an identical principle. However, it is preferable for the software to run on a mail server or MTA for the following reasons:

(1) the software controls delivery of the messages, and therefore is able to maximise use of a client's bandwidth to transferring legitimate messages.

(2) the database of previous digests to compare with is much larger than available on a client's machine, and so there is a relatively high chance of spotting a spam message or email worm.

The ability to run the software on a end user's machine is of use, however, where the user's ISP does not run software of this type, or the user has a need to download mail from several POP3 or IMAP accounts.

Yet a further extension of the above method is to use the software to maintain a store of digests for outgoing messages. The software could alert a user if he or she is suspected of circulating spam messages, or file attachments which may include a virus worm.

It is noted that the various options described above may be programmed or configured by a user and that the above detailed description of preferred embodiments of the invention is provided by way of example only. Other modifications which are obvious to a person skilled in the art may be made without departing from the true scope of the invention, as defined in the appended claims.

The invention claimed is:

1. A method for monitoring electronic mail messages comprising:
   receiving at a computer an electronic mail message comprising message content and header information, wherein said header information consists of subject header information and non-subject header information;
   generating a message digest from only the subject header information and the message content of the e-mail message;
   using an algorithm executed by the computer to generate a characteristic numerical representation of at least a part of said message digest, wherein the message digest is generated using a message digest algorithm, and wherein the message digest algorithm is a hash algorithm;
   storing said generated characteristic numerical representation in a memory of the computer;
   comparing said characteristic numerical representation with each characteristic numerical representation stored in the memory;
   if said characteristic numerical representation matches a previously-stored characteristic numerical representation, incrementing a count value associated with said characteristic numerical representation;
   determining that said received electronic mail message is an unwanted message if the incremented count value associated with said characteristic numerical representation matches a predetermined number; and
   determining an originator of said received electronic mail message if it is determined that said received electronic mail message is an unwanted message.

2. The method of claim 1, wherein the step of using an algorithm to generate comprises generating a characteristic numerical representation of at least a part of said message content and of said subject header information.

3. The method of claim 1, wherein the step of using an algorithm to generate comprises generating a characteristic numerical representation of at least textual content in said message content.

4. The method of claim 1, wherein said step of using an algorithm to generate comprises generating a characteristic numerical representation of at least attached files in said message content.

5. The method of claim 1, wherein said storing further comprises storing a timestamp of said electronic mail message.

6. The method of claim 1, wherein the storing further comprises storing the internet protocol address of origin of said electronic mail message.

7. The method of claim 1, wherein the storing further comprises storing header information of said electronic mail message.

8. The method of claim 7, wherein the storing said generated characteristic numerical representation in memory further comprises storing message source and destination details.

9. The method of claim 1, wherein the message digest is generated using a message digest-5 algorithm.

10. The method of claim 1, wherein the message digest is generated using a secure hash algorithm-1 algorithm.

11. The method of claim 1, further comprising comparing said count value with a predetermined threshold.

12. The method of claim 11, wherein said predetermined threshold is determined based on said header information.

13. The method of claim 11, further comprising, if said count value exceeds said predetermined threshold, raising an alert.

14. The method of claim 13, wherein said alert is determined based on said header information.

15. The method of claim 13, wherein said alert comprises a marker prefixed to the subject line of the message.

16. The method of claim 13, wherein said alert comprises delivering a fixed portion of said message.

17. The method of claim 13, wherein said alert comprises delivering an audit notification to the recipient.

18. The method of claim 13, wherein said alert comprises deleting said message.

19. The method of claim 13, wherein said alert comprises deleting a file attachment from the message.

20. The method of claim 1, further comprising allowing said message to be delivered if said characteristic numerical representation matches an approved characteristic numerical representation stored in the memory.

21. The method of claim 1, wherein said characteristic numerical representation is stored in cache memory.

22. The method of claim 21, wherein said cache memory is periodically copied to a storage means.

23. A software product stored on a non-transitory computer storage medium for use in a server or organization's mail transfer agent, for monitoring electronic mail messages, the software containing code for:
   receiving an electronic mail message comprising message content and header information, wherein said header information consists of subject header information and non-subject header information;
   generating a message digest from only the subject header information and the message content of the e-mail message;
   using an algorithm to generate a characteristic numerical representation of at least a part of said message digest, wherein the message digest is generated using a message digest algorithm, and wherein the message digest algorithm is a hash algorithm;
   storing said generated characteristic numerical representation in a memory;
   comparing said characteristic numerical representation with each characteristic numerical representation stored in the memory;
   if said characteristic numerical representation matches a previously stored characteristic numerical representation, incrementing a count value associated with said characteristic numerical representation to determine whether said received electronic mail message is an unwanted message if the incremented count value associated with said characteristic numerical representation matched a predetermined number; and
   determining an originator of said received electronic mail message if it is determined that said received electronic mail message is an unwanted message.

24. A software product stored on a non-transitory computer storage medium for use in a client's mail user agent, for monitoring electronic mail messages, the software containing code for:
   receiving an electronic mail message comprising message content and header information, wherein said header information consists of subject header information and non-subject header information;
   generating a message digest from only the subject header information and the message content of the e-mail message;
   using an algorithm to generate a characteristic numerical representation of at least a part of said message digest, wherein the message digest is generated using a message digest algorithm, and wherein the message digest algorithm is a hash algorithm;
   storing said generated characteristic numerical representation in a memory;
   comparing said characteristic numerical representation with each characteristic numerical representation stored in the memory;
   if said characteristic numerical representation matches a previously-stored characteristic numerical representation, incrementing a count value associated with said characteristic numerical representation;
   determining that said received electronic mail message is an unwanted message if the incremented count value associated with said characteristic numerical representation matches a predetermined number; and
   determining an originator of said received electronic mail message if it is determined that said received electronic mail message is an unwanted message.

25. The software product of claim 23, wherein said code for using an algorithm to generate comprises code for generating a characteristic numerical representation of at least a part of said message content and of said subject header information.

26. The software product of claim 23, wherein said code for using an algorithm to generate comprises code for generating a characteristic numerical representation of at least textual content in said message content.

27. The software product of claim 23, wherein said code for using an algorithm to generate comprises code for generating a characteristic numerical representation of at least attached files in said message content.

28. The software product of claim 23, wherein the code for storing further comprises code for storing a timestamp of said electronic mail message.

29. The software product of claim 23, wherein the code for storing further comprises code for storing the internet protocol address of origin of said electronic mail message.

30. The software product of claim 23, wherein said code for storing further comprises code for storing header information of said electronic mail message.

31. The software product of claim 23, wherein said code for storing further comprises code for storing message source and destination details.

32. The software product of claim 23, wherein said message digest is generated using a message digest-5 algorithm.

33. The software product of claim 23, wherein said message digest is generated using a secure hash algorithm-1 algorithm.

34. The software product of claim 23, further comprising code for comparing said count value with a predetermined threshold.

35. The software product of claim 34, wherein said predetermined threshold is determined based on said header information.

36. The software product of claim 34, further comprising, if said count value exceeds said predetermined threshold, code for raising an alert.

37. The software product of claim 36, wherein said alert is determined based on said header information.

38. The software product of claim 36, wherein said alert comprises a marker prefixed to the subject line of the message.

39. The software product of claim 36, wherein said alert comprises delivering a fixed portion of said message.

40. The software product of claim 36, wherein said alert comprises delivering an audit notification to the recipient.

41. The software product of claim 36, wherein said alert comprises deleting said message.

42. The software product of claim 36, wherein said alert comprises deleting a file attachment from the message.

43. The software product of claim 23, further comprising code for allowing said message to be delivered if said characteristic numerical representation matches an approved characteristic numerical representation stored in memory.

44. The software product of claim 23, wherein said characteristic numerical representation is stored in cache memory.

45. The software product of claim 44, wherein said cache memory is periodically copied to a storage means.

46. A computer system for monitoring electronic mail messages comprising:
   means for receiving an electronic mail message comprising message content and header information, wherein said header information consists of subject header information and non-subject header information;

means for generating a message digest from only the subject header information and the message content of the e-mail message;

an algorithm for generating a characteristic numerical representation of at least a part of said message digest, wherein said message digest is generated using a message digest algorithm, and wherein the message digest algorithm is a hash algorithm;

a memory for storing said generated characteristic numerical representation;

means for comparing said characteristic numerical representation with each characteristic numerical representation stored in the memory;

means for, if said characteristic numerical representation matches a previously stored characteristic numerical representation, incrementing a count value associated with said characteristic numerical representation;

means for determining whether said received electronic mail message is an unwanted message if the incremented count value associated with said characteristic numerical representation matches a predetermined number; and means for determining an originator of said received electronic mail message if it is determined that said received electronic mail message is an unwanted message.

47. The computer system of claim 46, wherein said means for generating comprises means for generating a characteristic numerical representation of at least a part of said message content and of said subject header information.

48. The computer system of claim 46, wherein said means for generating comprises means for generating a characteristic numerical representation of at least textual content in said message content.

49. The computer system of claim 47, wherein said means for generating comprises means for generating a characteristic numerical representation of at least attached files in said message content.

50. The computer system of claim 46, wherein said memory further comprises means for storing a timestamp of said electronic mail message.

51. The computer system of claim 46, wherein said memory further comprises means for storing the internet protocol address of origin of said electronic mail message.

52. The computer system of claim 46, wherein said memory further comprises means for storing header information of said electronic mail message.

53. The computer system of claim 46, wherein said memory further comprises means for storing message source and destination details.

54. The computer system of claim 46, wherein said message digest is generated using a message digest-5 algorithm.

55. The computer system of claim 46, wherein said message digest is generated using a secure hash algorithm-1 algorithm.

56. The computer system of claim 46, further comprising means for comparing said count value with a predetermined threshold.

57. The computer system of claim 56, wherein said predetermined threshold is determined based on said header information.

58. The computer system of claim 56, further comprising means for raising an alert if said count value exceeds said predetermined threshold.

59. The computer system of claim 58, wherein said alert is determined based on said header information.

60. The computer system of claim 58, wherein said alert comprises a marker prefixed to the subject line of the message.

61. The computer system of claim 58, wherein said alert comprises means for delivering a fixed portion of said message.

62. The computer system of claim 58, wherein said alert comprises delivering an audit notification to the recipient.

63. The computer system of claim 58, wherein said alert comprises deleting said message.

64. The computer system of claim 58, wherein said alert comprises deleting a file attachment from said message.

65. The computer system of claim 46, further comprising means for allowing said message to be delivered if said characteristic numerical representation matches an approved characteristic numerical representation stored in memory.

66. The computer system of claim 46, wherein said characteristic numerical representation is stored in cache memory.

67. The computer system of claim 66, wherein said cache memory is periodically copied to a storage means.

68. The software product of claim 24, wherein said code for using an algorithm to generate comprises code for generating a characteristic numerical representation of at least a part of said message content and of said subject header information.

69. The software product of claim 24, wherein said code for using an algorithm to generate comprises code for generating a characteristic numerical representation of at least textual content in said message content.

70. The software product of claim 24, wherein said code for using an algorithm to generate comprises code for generating a characteristic numerical representation of at least attached files in said message content.

71. The software product of claim 24, wherein the code for storing further comprises code for storing a timestamp of said electronic mail message.

72. The software product of claim 24, wherein the code for storing further comprises code for storing the internet protocol address of origin of said electronic mail message.

73. The software product of claim 24, wherein said code for storing further comprises code for storing header information of said electronic mail message.

74. The software product of claim 24, wherein said code for storing further comprises code for storing message source and destination details.

75. The software product of claim 24, wherein said message digest is generated using a message digest-5 algorithm.

76. The software product of claim 24, wherein said message digest is generated using a secure hash algorithm-1 algorithm.

77. The software product of claim 24, further comprising code for comparing said count value with a predetermined threshold.

78. The software product of claim 77, wherein said predetermined threshold is determined based on said header information.

79. The software product of claim 77, further comprising, if said count value exceeds said predetermined threshold, code for raising an alert.

80. The software product of claim 79, wherein said alert is determined based on said header information.

81. The software product of claim 79, wherein said alert comprises a marker prefixed to the subject line of the message.

82. The software product of claim 79, wherein said alert comprises delivering a fixed portion of said message.

83. The software product of claim 79, wherein said alert comprises delivering an audit notification to the recipient.

84. The software product of claim 79, wherein said alert comprises deleting said message.

85. The software product of claim 79, wherein said alert comprises deleting a file attachment from the message.

86. The software product of claim 24, further comprising code for allowing said message to be delivered if said characteristic numerical representation matches an approved characteristic numerical representation stored in memory.

87. The software product of claim 24, wherein said characteristic numerical representation is stored in cache memory.

88. The software product of claim 87, wherein said cache memory is periodically copied to a storage means.

89. A method as claimed in claim 1, wherein the step of determining the originator of the received electronic mail message comprises:
    examining the characteristic numerical representations stored in the memory to determine a sender of a first message having a characteristic numerical representation matching the characteristic numerical representation of the received electronic mail message.

90. The software product of claim 23, wherein the code for determining the originator of the received electronic mail message comprises:
    examining the characteristic numerical representations stored in the memory to determine a sender of a first message having a characteristic numerical representation matching the characteristic numerical representation of the received electronic mail message.

91. The software product of claim 24, wherein the code for determining the originator of the received electronic mail message comprises:
    examining the characteristic numerical representations stored in the memory to determine a sender of a first message having a characteristic numerical representation matching the characteristic numerical representation of the received electronic mail message.

92. The computer system of claim 46, wherein the means for determining the originator of the received electronic mail message comprises:
    means for examining the characteristic numerical representations stored in the memory to determine a sender of a first message having a characteristic numerical representation matching the characteristic numerical representation of the received electronic mail message.

93. A method for monitoring electronic mail messages comprising:
    receiving at a computer an electronic mail message intended for a recipient, the message comprising message content and header information, wherein the header information consists of subject header information and non-subject header information;
    generating a message digest from only the subject header information and the message content of the e-mail message;
    using an algorithm executed by the computer to generate a characteristic numerical representation of at least a part of said message digest, wherein the message digest is generated using a message digest algorithm, and wherein the message digest algorithm is a hash algorithm;
    storing said generated characteristic numerical representation in a memory of the computer;
    comparing said characteristic numerical representation with each characteristic numerical representation stored in the memory
    if said characteristic numerical representation matches a previously-stored characteristic numerical representation, incrementing a count value associated with said characteristic numerical representation;
    determining that the received electronic mail message is an unwanted message if the incremented count value associated with said characteristic numerical representation matches a predetermined number; and
    forwarding a condensed form of the message and an audit notification to the recipient, if it is determined that the received electronic mail message is an unwanted message.

94. A method for monitoring electronic mail messages comprising:
    receiving at a computer an electronic mail message comprising message content and header information, wherein said header information consists of subject header information and non-subject header information;
    generating a message digest from only the subject header information and the message content of the e-mail message;
    generating, using the computer, a characteristic numerical representation of at least a part of said message digest, wherein the message digest is generated using a message digest algorithm, and wherein the message digest algorithm is a hash algorithm;
    storing said generated characteristic numerical representation in a memory of the computer;
    comparing said characteristic numerical representation with each characteristic numerical representation stored in the memory;
    if said characteristic numerical representation matches a previously-stored characteristic numerical representation, incrementing a count value associated with said characteristic numerical representation.

\* \* \* \* \*